US012747765B2

(12) United States Patent
Jung et al.

(10) Patent No.: US 12,747,765 B2
(45) Date of Patent: Sep. 29, 2026

(54) TEMPERATURE SENSOR AND DISC BRAKE HAVING THE SAME

(71) Applicant: HL MANDO CORPORATION, Pyeongtaek-si (KR)

(72) Inventors: Yong Kyun Jung, Gyeonggi-do (KR); Jong Sik Song, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 761 days.

(21) Appl. No.: 17/973,523

(22) Filed: Oct. 25, 2022

(65) Prior Publication Data

US 2023/0128353 A1 Apr. 27, 2023

(30) Foreign Application Priority Data

Oct. 26, 2021 (KR) ........................ 10-2021-0143425
Oct. 18, 2022 (KR) ........................ 10-2022-0134272

(51) Int. Cl.
*F16D 66/00* (2006.01)
*G01K 1/143* (2021.01)

(52) U.S. Cl.
CPC ............. *F16D 66/00* (2013.01); *G01K 1/143* (2013.01); *F16D 2066/001* (2013.01)

(58) Field of Classification Search
None
See application file for complete search history.

(56) References Cited

U.S. PATENT DOCUMENTS 4,241,603 A * 12/1980 Han ........................ G01K 1/143 374/E1.019
4,566,805 A * 1/1986 Klein ................. G01N 33/2847 188/1.11 R
4,569,600 A * 2/1986 Preniczny ............. G01J 5/0808 188/1.11 R
2005/0189957 A1* 9/2005 Lopez .................. G01R 1/0458 374/E1.021
2006/0215731 A1* 9/2006 Gadonniex .............. G01K 1/16 374/185

FOREIGN PATENT DOCUMENTS

CN 113470324 A * 10/2021
GB 2587782 A * 4/2021 ........... F16D 65/853
JP 2020134176 A * 8/2020
RU 2664980 C1 * 8/2018 .............. G01J 5/041

OTHER PUBLICATIONS

JP-2020134176-A—English Machine Translation (Year: 2020).*
CN-113470324-A—English Machine Translation (Year: 2021).*
RU-2664980-C1: English Machine Translation (Year: 2018).*

* cited by examiner

*Primary Examiner* — Melanie Torres Williams
(74) *Attorney, Agent, or Firm* — WOMBLE BOND DICKINSON (US) LLP

(57) ABSTRACT

A temperature sensor and a disc brake having the temperature sensor are provided. According to an aspect of the present disclosure, the temperature sensor for measuring the temperature of a first surface may include: a housing having a second surface receiving heat from the first surface and a third surface formed on one side of a first inner space formed inside to receive heat from the second surface; a temperature sensing module sensing the temperature of the third surface; and a connector transmitting temperature information sensed by the temperature sensing module to the outside.

17 Claims, 9 Drawing Sheets

TEMPERATURE SENSOR AND DISC BRAKE HAVING THE SAME

CROSS REFERENCE TO RELATED APPLICATION

The present application claims priority to Korean Patent Application No. 10-2021-0143425, filed Oct. 26, 2021 and Korean Patent Application No. 10-2022-0134272, filed Oct. 18, 2022, the entire contents of which is incorporated herein for all purposes by this reference.

BACKGROUND OF THE INVENTION

Field of the Invention

The present disclosure relates to a temperature sensor and a disc brake having the temperature sensor, and more particularly, to a temperature sensor measuring the temperature of a disc and a disc brake having the temperature sensor.

Description of the Related Art

A disc brake refers to a brake that provides braking force by attaching a metal disc to a rotating shaft of a wheel and pressing both sides of the disc with brake pads made of a material having a high coefficient of friction.

A disc brake stops a wheel because the frictional force generated by pressing the disc with brake pads converts the rotational kinetic energy of the wheel into thermal energy. Since the disc brake inevitably generates heat during the braking process of the wheel, the disc and brake pads are made of highly durable materials.

However, a problem is that use of the disc may deteriorate the durability of the disc and brake pad or sufficient braking force may not be provided due to an abnormality arising from the excessive use of the disc and brake pad, which may lead to a serious accident.

Accordingly, attempts have been made to forestall an abnormal situation with the disc brake by measuring the temperature of the disc in real time while the disc brake is in use.

However, the conventional probe temperature sensor installed near the disc for measuring the temperature of the disc is slow in measuring the temperature such that measuring the heat of the instantaneously heating disc in real time is difficult.

Further, the conventional infrared temperature sensor is suitable for quickly measuring the disc temperature in real time, but unlike the probe temperature sensor, the durability is poor and the measurement accuracy decreased due to the environment.

SUMMARY OF THE INVENTION

An object of the present disclosure is to provide a temperature sensor configured to measure the temperature of a measurement target free from the effect of the environment and a disc brake having the temperature sensor.

Objects of the present disclosure are not limited to the objects described above, and other objects not described will be clearly understood by those skilled in the art to which the present disclosure pertains from the following descriptions.

According to an aspect of the present disclosure, there is provided a temperature sensor for measuring the temperature of a first surface of a measurement target. The temperature sensor includes: a housing having a second surface formed outside to be spaced apart from the first surface at a predetermined interval to receive heat from the first surface and a third surface formed inside on one side of a first inner space formed inside to receive heat from the second surface; a temperature sensing module fixed to the housing to measure the temperature of the third surface; and a connector transmitting temperature information sensed by the temperature sensing module to the outside.

The temperature sensing module may be fixed on the other side of the first inner space and the first inner space may be closed off to the outside.

The temperature sensing module may be disposed to face the second surface.

The temperature sensing module may measure the temperature of the third surface by sensing infrared rays emitted from the third surface.

The third surface may be positioned to face the second surface.

The third surface may be formed such that the center of the third surface coincides with the center of the sensing region of the temperature sensing module.

The housing may include a holder of which the temperature sensing module is fixed to one side and the connector is connected to the other side, a first cover connected to one side of the holder to form the closed first inner space, the second surface may be formed on one side of the outside of the first cover, and the third surface may be formed on one side of the inside of the first cover.

The housing may include a second cover coupled to the other side of the holder to form a closed second inner space, and the connector may be connected to the temperature sensing module through a conductive cable.

The second cover may include a cover through hole formed on one side, one end of the conductive cable may be disposed in the second inner space through the cover through hole, and a second sealing member disposed between the cover through hole and the outer circumferential surface of the conductive cable may be further included.

The third surface may be included in a sensing region of the temperature sensing module.

The third surface may be spaced apart from the temperature sensing module at a predetermined distance.

The housing may extend in the sensing direction of the temperature sensing module, and the second surface may be formed on the outer surface of the extending tip end portion of the housing.

The housing may be formed such that the area of a cross section perpendicular to the sensing direction decrease toward the extending tip end portion.

The housing may include a first protrusion protruding toward the first surface of the measurement target, the second surface may be formed outside the tip end portion of the first protrusion, and the third surface may be formed inside the tip end portion of the first protrusion.

On the other hand, according to another aspect of the present disclosure, there is provide a disc brake having a temperature sensor. The disc brake includes: a plate-shaped disc; a first brake pad and a second brake pad configured to press one side of one surface and one side of the other surface of the disc respectively; a temperature sensor having a housing of which a second surface is formed on one side of the outside and a third surface is formed on one side of the inside, a temperature sensing module fixed to the housing to sense the temperature of the third surface, and a connector transmitting the temperature information sensed by the temperature sensing module to the outside; and a bracket fixing the housing such that the second surface of the housing is positioned to be spaced apart at a third interval from a first surface positioned on the other side of the other surface of the disc.

The bracket may fix the housing so that the second surface is parallel to the first surface.

The bracket may include a first through hole, and the housing may be inserted into the first through hole to be coupled by screwing.

the first through hole may penetrate the bracket in the direction perpendicular to the first surface, and the housing may move back and forth in the direction perpendicular to the first surface in the rotation direction.

the bracket may further include a first through hole penetrating in the direction perpendicular to the first surface and a second through hole penetrating in the penetrating direction of the first through hole, the housing may further include a third protrusion protruding from the side and a third through hole penetrating the third protrusion in a sensing direction of the temperature sensing module, and the housing may be inserted into the first through hole to be coupled by screwing through the second through hole and the third through hole.

the housing may include a first protrusion protruding toward the first surface of the disc, the second surface may be formed outside the tip end portion of the first protrusion, the third surface may be formed inside the tip end portion of the first protrusion, the bracket may further include a first through hole penetrating in a direction perpendicular to the first surface, a second through hole penetrating in the penetrating direction of the first through hole, a cover portion covering the first surface side of the first through hole, and a fourth through hole formed in the cover portion, the housing may be inserted into the first through hole, and the first protrusion of the housing may be inserted into the fourth through hole.

DETAILED DESCRIPTION OF THE INVENTION

Figure 1:
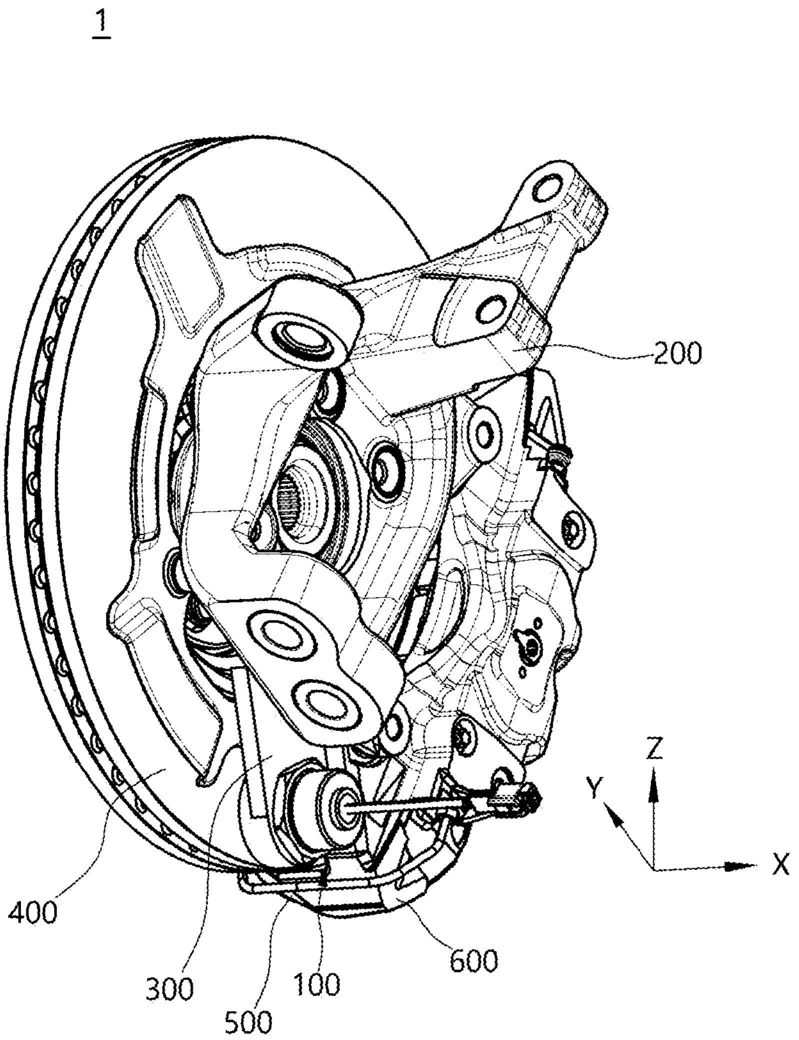
FIG. 1 is a perspective view of a disc brake having a temperature sensor according to a first embodiment of the present disclosure.

Hereinafter, embodiments of the present disclosure are described in detail so that those skilled in the art to which the present disclosure pertains may readily embody the present disclosure. The present disclosure may be implemented in various forms and is not limited to the embodiments described herein. The parts irrelevant to the descriptions are omitted from the drawings for a clearer description of the present disclosure, and the same reference numerals are assigned to the same or similar components throughout the specification.

The words and terms used in the present specification and claims are not to be construed as limited to their conventional or dictionary meanings but construed in terms of meanings and concepts consistent with the technical ideas of the present disclosure in accordance with the principles by which the inventor may define the terms and concepts to best describe his/her disclosure.

Therefore, the embodiments described in the present specification and the configurations illustrated in the drawings correspond to preferred embodiments of the present disclosure and do not represent all of the technical ideas of the present disclosure so that the configurations may be replaced with various equivalents and modification examples when the application of the present disclosure is filed.

In the present specification, terms such as “comprise” or “have” are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

The presence of one component “in front of”, “in the rear of”, above”, or “below” another component includes not only the one component being disposed “in front of”, “in the rear of”, “above”, or “below” the another component in direct contact but a third component being interposed therebetween unless otherwise specified. Further, “connection” of one component to another component includes an indirect connected as well as a direct connection to each other unless otherwise specified.

Hereinafter, a disc brake 1 having a temperature sensor 100 according to various embodiments of the present disclosure will be described with reference to the drawings.

Figure 2:
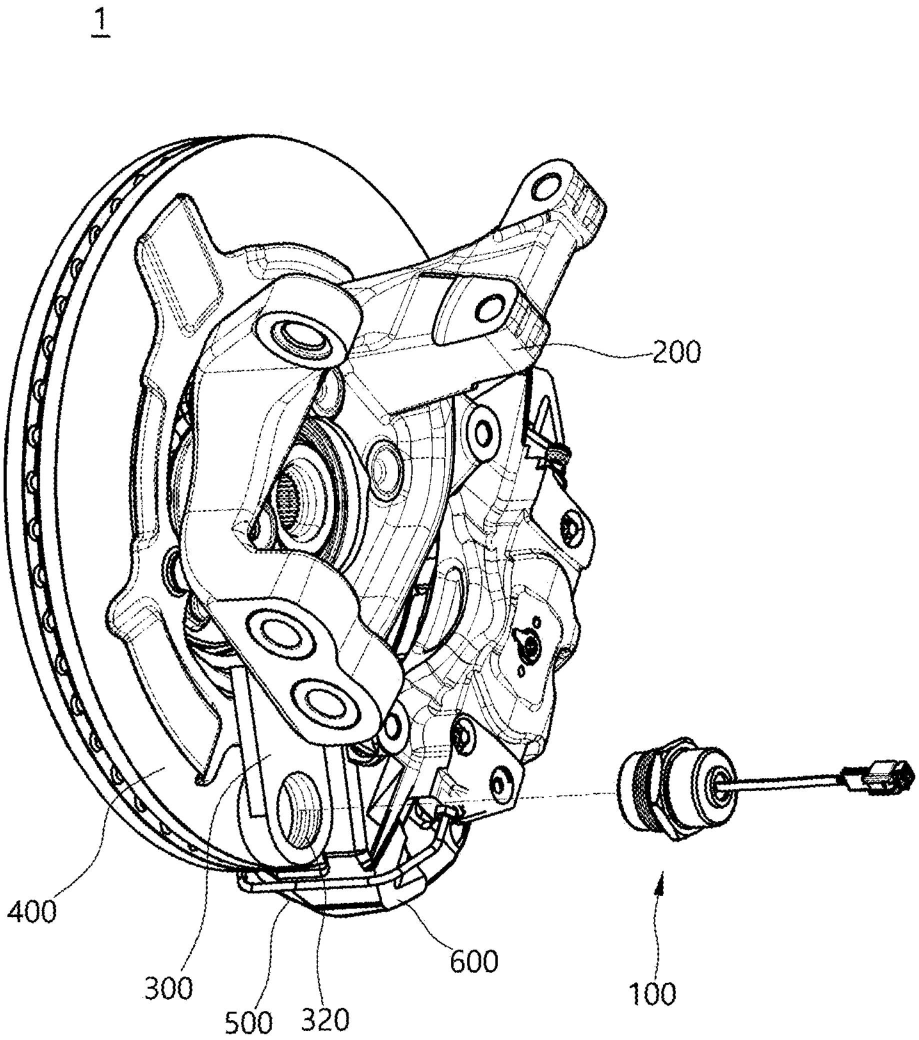
FIG. 2 is an exploded perspective view of a disc brake having a temperature sensor according to an embodiment of the present disclosure.
Figure 3:
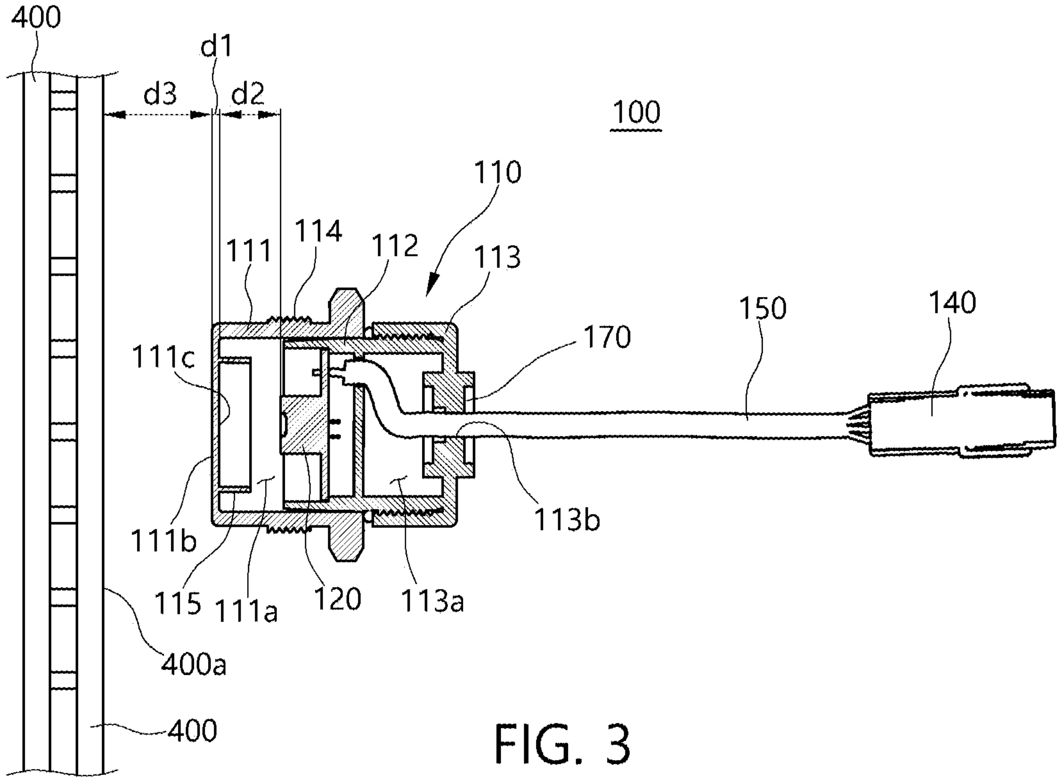
FIG. 3 is a longitudinal view of a temperature sensor according to a first embodiment of the present disclosure.

FIG. 1 is a perspective view of a disc brake having a temperature sensor according to a first embodiment of the present. FIG. 2 is an exploded perspective view of the disc brake having the temperature sensor according to the first embodiment of the present disclosure. FIG. 3 is a longitudinal view of the temperature sensor according to the first embodiment of the present disclosure. Hereinafter, the direction opposite the direction of X-axis will be defined as a front, the direction of the Y-axis will be defined as a side, and the direction of the Z-axis will be defined as upward.

As illustrated in FIG. 1, a disc brake 1 having a temperature sensor 100 according to a first embodiment of the present disclosure includes a disc 400, the temperature sensor 100, and a bracket 300.

As illustrated in FIGS. 1 and 2, the disc 400 is formed in a disc shape. At this time, the disc 400 is fixed to a rotating shaft of a wheel and rotates with the wheel. A first brake pad and a second brake pad are respectively disposed adjacent to the front surface and the rear surface of the disc 400 to provide a braking force against the rotation of the wheel. The first brake pad and the second brake pad are fixed to a pad housing 500 and a carrier 600 so that the pads may respectively contact one side of the front surface and one side of the rear surface of the disc 400.

At this time, a pad housing 500 and the carrier 600 are movably coupled relative to each other. The first brake pad and the second brake pad may contact the disc 400 in the moving direction of the pad housing 500 and the carrier 600. Accordingly, the first brake pad and the second brake pad may simultaneously press the front surface and the rear surface of the disc 400, and the friction force between the first and second brake pads and the disc 400 provides a braking force against the rotation of the wheel.

However, there is no limit in the shape or coupling structure of the pad housing 500 and the carrier 600 for pressing the disc 400 as described above. Various pad housings 500 and carriers 600 may be used as long as the front surface and the rear surface of the disc 400 may be pressed by the first brake pad and the second brake pad.

Heat due to friction is generated in the process of pressing the disc 400 by the first brake pad and the second brake pad. Accordingly, the temperature of the disc 400 rapidly increases.

When the temperature of the disc 400 exceeds a predetermined range, deformation of the surface of the disc 400 or thermal damage to the first brake pad or the second brake pad may make it difficult to provide adequate braking force sometimes. Since braking is directly related to the safety of the driver, it is important to track and observe the temperature of the disc 400 to forestall a decrease of braking force caused by overheating of the disc 400.

As illustrated in FIGS. 1 and 2, the temperature sensor 100 for measuring the temperature of the disc 400 is disposed adjacent to the disc 400. That is, a measurement target of the temperature sensor 100 is the disc 400, and the temperature sensor 100 measures the temperature of one side of the rear surface of the disc 400 referred to as a first surface 400*a*.

The temperature sensor 100 is disposed on the other side of the rear surface of the disc 400. That is, the second brake pad is disposed on one side of the rear surface of the disc 400, and the temperature sensor 100 is disposed on the other side of the rear surface of the disc 400.

The present specification describes temperature measurement of the other side on the rear surface of the disc 400 by the temperature sensor 100, but the measurement target of the temperature sensor 100 according to various embodiments of the present disclosure is not limited to the disc 400 provided in the disc brake 1.

According to the first embodiment of the present disclosure, as illustrated in FIG. 3, the temperature sensor 100 includes the housing 110, a temperature sensing module 120, and a connector 140.

As illustrated in FIG. 3, a first inner space 111*a* is formed inside the housing 110. At this time, the temperature sensing module 120 is disposed in the inner space. Accordingly, the temperature sensing module 120 may be protected from outside foreign substances.

At this time, the housing 110 may be divided into a holder 112, a first cover 111, and a second cover 113. The holder 112 supports the temperature sensing module 120 so that the temperature sensing module 120 may be fixed in the first inner space 111*a*. As illustrated in FIG. 3, the temperature sensing module 120 is fixed to the front side of the holder 112.

At this time, as illustrated in FIG. 3, the first cover 111 is coupled to the front of the holder 112. The first cover 111, together with the holder 112, forms the first inner space 111*a* that is closed off to the outside therein.

There is no limit in the way the first cover 111 and the holder 112 are coupled to each other. In the present embodiment, a screw thread is formed on the inner circumferential surface of the first cover 111 and a screw thread is formed on the outer circumferential surface on the front side of the holder 112 so that the first cover 111 and the holder 112 are coupled by screwing.

There is no limit in the shape of the first cover 111 as long as a space may be formed therein. According to the embodiment, as illustrated in FIGS. 2 and 3, the first cover 111 is formed in a cylindrical shape and is open on the side coupled to the holder 112 and closed on the other side. At this time, the first cover 111 may be structured such that a front plate is positioned on the front and an outer wall extends rearward from the rim of the front plate.

As illustrated in FIG. 3, a second surface 111*b* and a third surface 111*c* are respectively formed at the tip end portion of the first cover 111, that is, the front side and rear side of the front plate of the first cover 111.

The second surface 111*b* and the third surface 111*c* may refer to the entire front surface and rear surface of the front plant of the first cover 111 or may refer to a part of the front surface and the rear surface.

The second surface 111*b* is formed outside the first cover 111, and the third surface 111*c* is formed inside the first cover 111. That is, the second surface 111*b* is formed to face the first surface 400*a*, and the third surface 111*c* is formed to face the temperature sensing module 120.

As illustrated in FIG. 3, the first cover 111 may extend to the front. At this time, the second surface 111*b* is formed on the outer surface of the extending tip end portion of the first cover 111. At this time, the second surface 111*b* is positioned adjacent to the first surface 400*a*.

To be more specific, as illustrated in FIG. 3, the first cover 111 may extend to the front so that a third interval d3, which refers to the distance between the first surface 400*a* positioned on one side in the rear of the disc 400 and the second surface 111*b* positioned on the tip end portion surface of the first cover 111, may be within a predetermined length.

At this time, since the second surface 111*b* is to be disposed adjacent to the first surface 400*a*, the second surface 111*b* is formed at the outermost side of the tip end portion of the first cover 111. Accordingly, the second surface 111*b* and the first surface 400*a* are formed to face each other.

In particular, the first surface 400*a* and the second surface 111*b* may be formed parallel to each other so that heat generated from the first surface 400*a* may be evenly transferred to the second surface 111*b*.

The third surface 111*c* formed inside the first cover 111 and the second surface 111*b* face opposite directions. A detailed description of the third surface 111*c* will be provided in the description of a second embodiment below.

As illustrated in FIG. 3, a partitioning wall 115 separating the third surface 111*c* on the inner surface of the first cover 111 may be formed in the first cover 111. The partitioning wall 115 is formed along the circumferential surface of the third surface 111*c*. The partitioning wall 115 may be formed in a cylindrical shape.

On the other hand, the second surface 111*b* may be formed smaller than the first surface 400*a* so that the second surface 111*b* may receive heat more efficiently. To this end, the first cover 111 of the temperature sensor 100 of the disc brake 1 having the temperature sensor 100 according to a second embodiment of the present disclosure may be formed such that the area of the cross section perpendicular to the extending direction of the first cover 111 decreases toward the front. At this time, there is no limit in the form of the gradually decreasing cross sectional area of the first cover 111.

Figure 4:
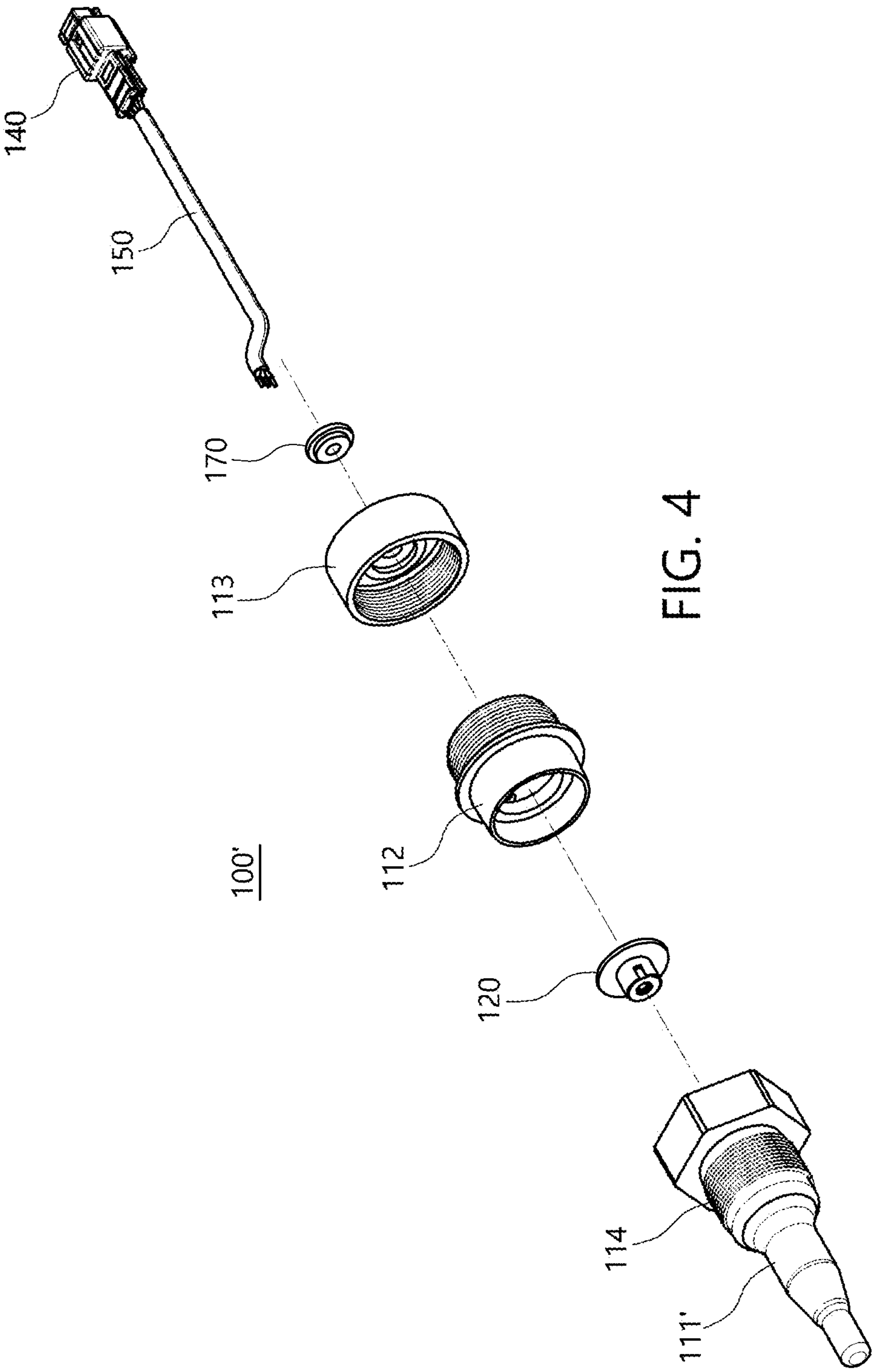
FIG. 4 is an exploded perspective view of a temperature sensor viewed from one direction according to a second embodiment of the present disclosure.
Figure 5:
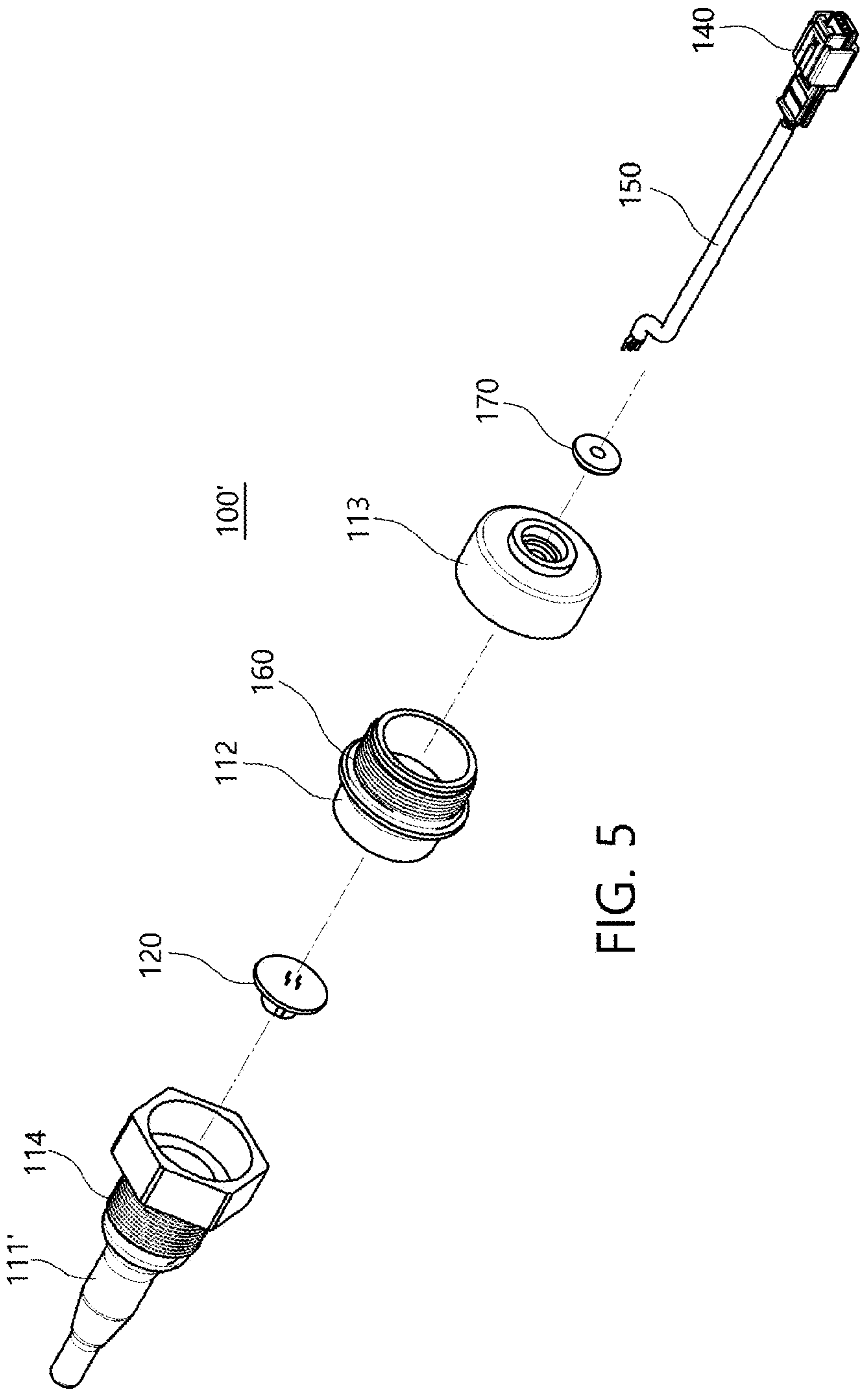
FIG. 5 is an exploded perspective view of a temperature sensor viewed from the other direction according to a second embodiment of the present disclosure.
Figure 6:
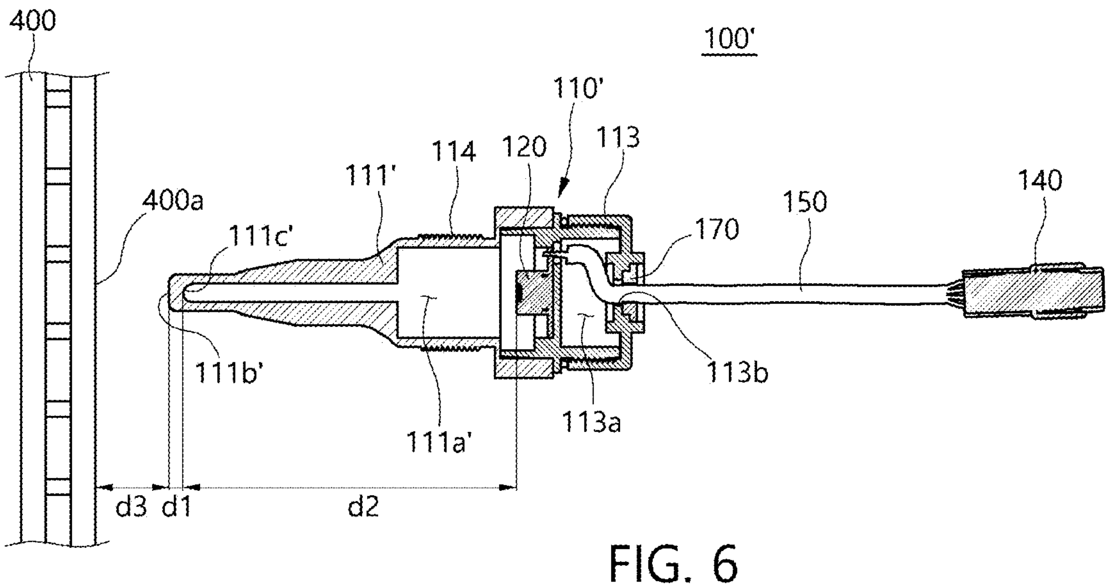
FIG. 6 is a longitudinal view of a temperature sensor according to a second embodiment of the present disclosure.

FIG. 4 is an exploded perspective view of a temperature sensor viewed from one direction according to the second embodiment of the present disclosure. FIG. 5 is an exploded perspective view of the temperature sensor viewed from the other direction according to the second embodiment of the present disclosure. FIG. 6 is a longitudinal view of the temperature sensor according to the second embodiment of the present disclosure.

As illustrated in FIGS. 4 and 5, a first cover 111' may be divided into sections in the extending direction such that the sections having the same cross sectional area and the sections having a decreasing cross sectional area are alternately positioned. Alternatively, the first cover 111' may be formed such that the cross sectional area of the first cover 111', rather than linearly decreasing, decreases while the side surface of the first cover 111' is formed convex or concave in the sections having a decreasing cross sectional area. This is not illustrated in the drawings.

As illustrated in FIG. 6, a third surface 111*c*' is formed inside the first cover 111'. A third surface 111*c*' and a second surface 111*b*' are disposed to face each other. That is, the third surface 111*c*' and the second surface 111*b*' may be disposed to face opposite directions.

At this time, the distance between the second surface 111*b*' and the third surface 111*c*' is defined as a first interval d1. The first interval d1 may be formed thin so that the heat transferred to the second surface 111*b*' from the first surface 400*a* may be fully transferred to the third surface 111*c*' along the first cover 111'.

At this time, the third surface 111*c*' is disposed in the area in which the temperature sensing module 120 measures the temperature. Accordingly, the first interval d1 may be determined such that the temperature of the third surface 111*c*' is within a temperature range measurable by the temperature sensing module 120 when the heat transferred to the second surface 111*b*' is transferred to the third surface 111*c*'.

As illustrated in FIG. 6, the second surface 111*b*' and the third surface 111*c*' may be formed parallel to each other. This allows the heat transferred from the second surface 111*b*' to the third surface 111*c*' to be evenly transferred over the entire third surface 111*c*', thereby reducing the temperature measurement error of the temperature sensing module 120.

As illustrated: in FIG. 6, the space between the temperature sensing module 120 and the third surface 111*c*' inside the first cover 111' is empty so that the temperature sensing module 120 may measure the temperature of the third surface 111*c*'. At this time, the distance between the temperature sensing module 120 and the third surface 111*c*' is defined as a second interval d2.

The space between the third surface 111*c*' and the temperature sensing module 120 may have the same cross section perpendicular to the extending direction of the first cover 111. This may not only increase the durability of the first cover 111 but also prevent heat from being transferred to the temperature sensing module 120 disposed inside the first cover 111' when the heat emitted from the rear surface of the disc 400 including the first surface 400*a* is transferred through the first cover 111'.

Figure 7:
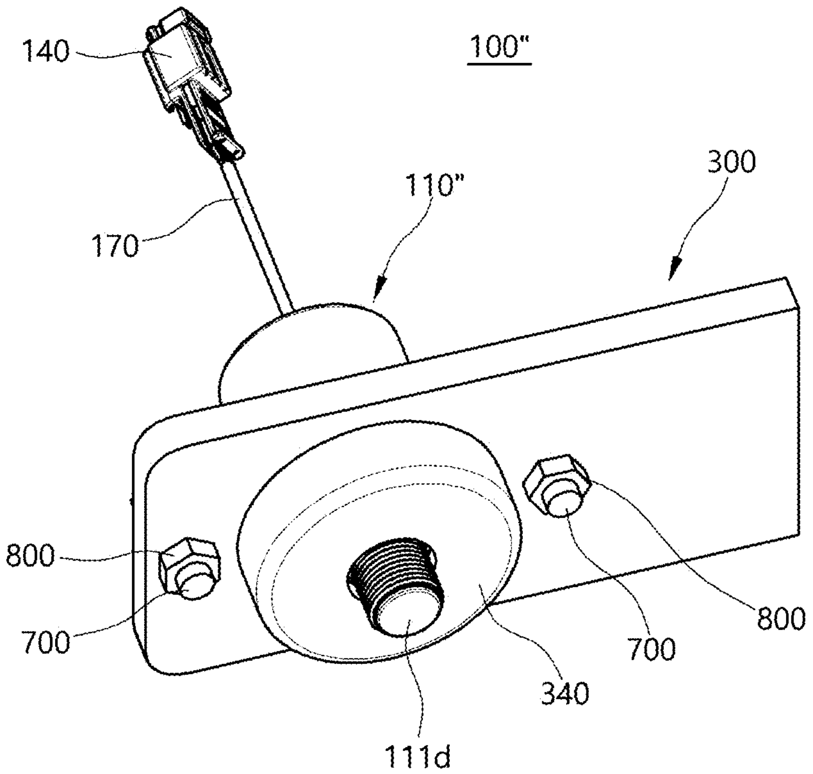
FIG. 7 is a perspective view of a temperature sensor according to a third embodiment of the present disclosure.
Figure 8:
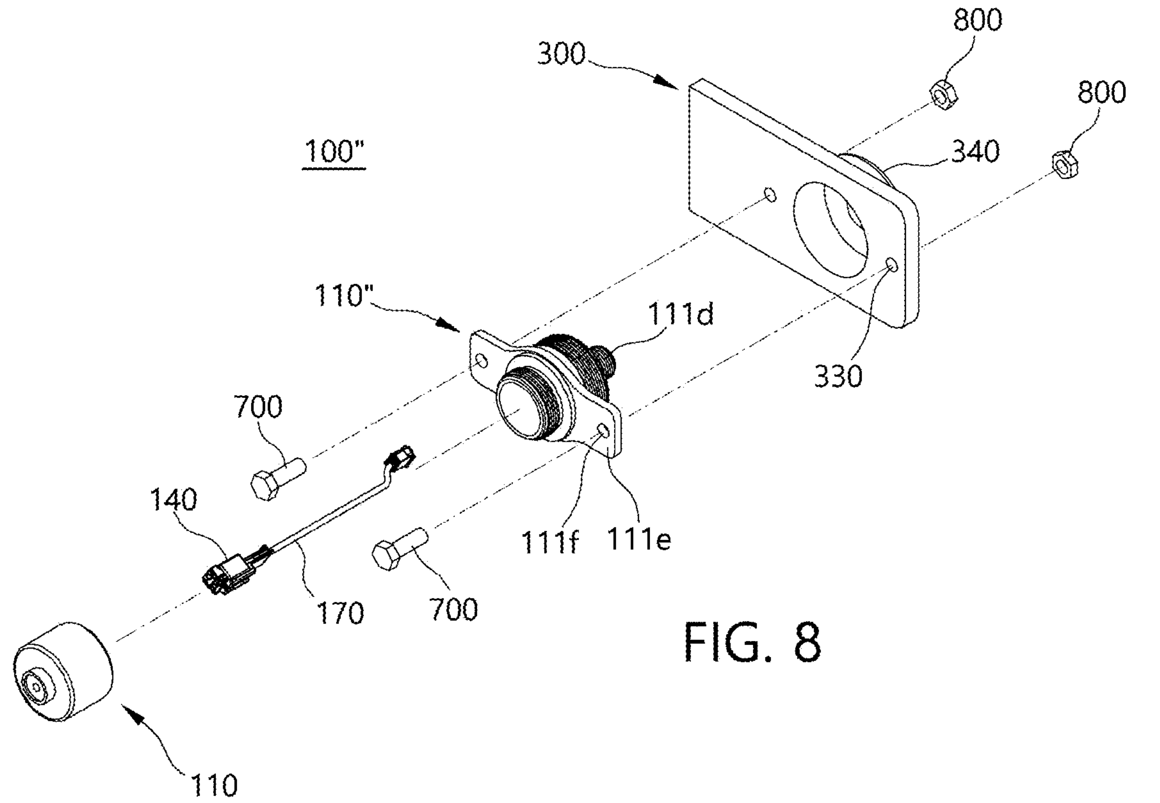
FIG. 8 is an exploded perspective view of a temperature sensor according to a third embodiment of the present disclosure.
Figure 9:
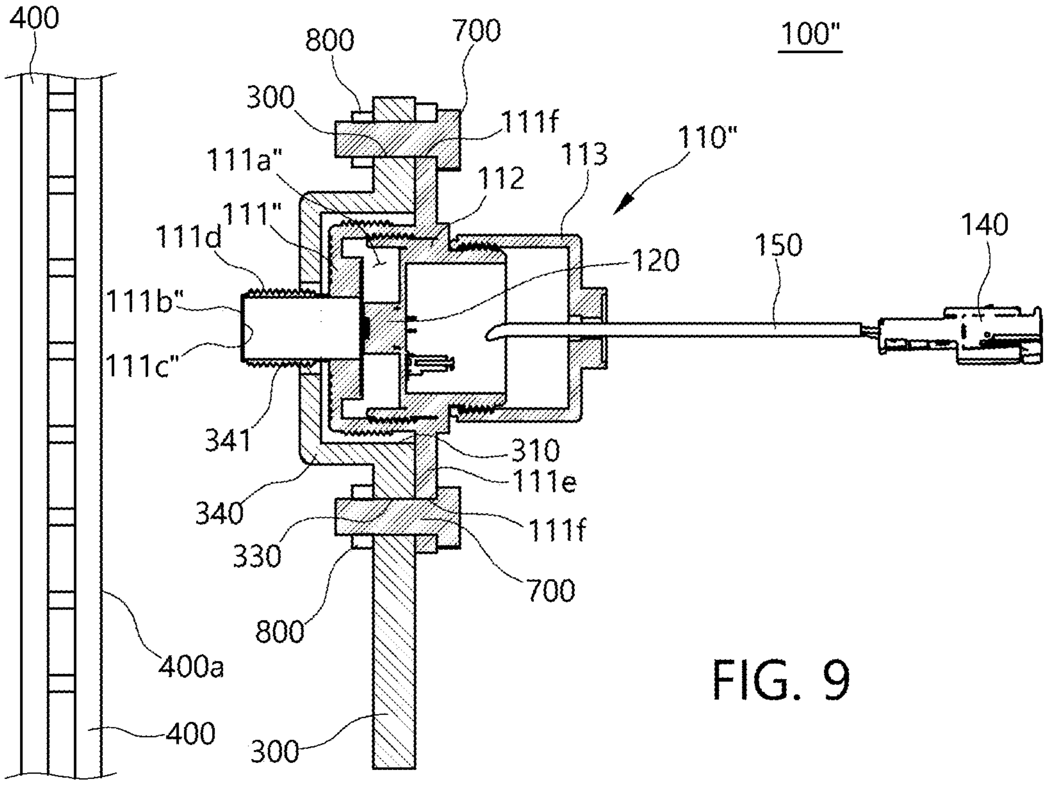
FIG. 9 is a longitudinal view of a temperature sensor according to a third embodiment of the present disclosure.

FIG. 7 is a perspective view of a temperature sensor according to a third embodiment of the present disclosure. FIG. 8 is an exploded perspective view of a temperature sensor according to the third embodiment of the present disclosure. FIG. 9 is a longitudinal view of a temperature sensor according to the third embodiment of the present disclosure.

As illustrated in FIG. 7, a first cover 111" of a temperature sensor 100" of the disc brake 1 having the temperature sensor 100" according to the third embodiment of the present disclosure may include a first protrusion 111*d*.

At this time, as illustrated in FIGS. 8 and 9, the first cover 111" extends in the front/rear direction and is formed in a closed cylindrical shape. The first protrusion 111*d* protrudes to the front from the center of the closed tip end portion.

As illustrated in FIG. 7, the first protrusion 111*d* may be formed in a cylindrical shape. The cross sectional area perpendicular to the protruding direction of the first protrusion 111*d* may be kept constant. However, the present disclosure is not limited thereto, and the cross sectional area may decrease toward the front, as in the second embodiment of the present disclosure.

As s illustrated in FIG. 7, the outer circumferential surface of the first protrusion 111*d* may be corrugated. This increases the area of the outer surface facing the disc 400. That is, the amount of heat transferred to the inside of the first protrusion 111*d* from the outer surface increases, thereby improving the sensing accuracy of the temperature sensing module 120.

As illustrated in FIG. 9, a second surface 111*b*" is formed on the outer tip end portion surface of the first protrusion 111*d*, and a third surface 111*c*" is formed on the inner tip end portion surface of the first protrusion 111*d*. At this time, the detailed description of the second surface 111*b*" and the third surface 111*c*" is replaced with the description in the second embodiment.

On the other hand, the temperature sensing module 120 senses the temperature of the third surface 111*c*". The temperature sensing module 120 may use various known sensor modules as long as the sensor modules may sense the temperature of the third surface 111*c*" without directly contacting the third surface 111*c*". For example, the temperature sensing module 120 according to the present embodiment may be an infrared sensor module that measures the temperature of the third surface 111*c*" by sensing infrared rays emitted from the third surface 111*c*".

As illustrated in FIG. 9, the temperature sensing module 120 is disposed toward the front in the first inner space 111*a*" formed by the first cover 111" and the holder 112 to measure the temperature of the third surface 111*c*".

Since the temperature sensing module 120 is a sensor module susceptible to the environment, the first inner space 111*a*" is closed off to the outside. That is, the first inner space 111*a*" is closed off to the outside by the first cover 111" and the holder 112.

The temperature sensing module 120 is fixed to the holder 112 such that the sensing region includes the third surface 111*c*". That is, the holder 112 or the bracket 300 may be designed by adjusting the second interval d2 so that the temperature sensing module 120 may accurately measure the temperature of the third surface 111*c*". At this time, the temperature sensing module 120 is disposed such that the center of the sensing region coincides with the center of the third surface 111*c*" to improve the sensing accuracy of the temperature sensing module 120.

On the other hand, as illustrated in FIG. 6, the first cover 111' of the temperature sensor 100' according to the second embodiment of the present disclosure may be formed such that the third space 111*c*' is formed inside the first cover 111' to be included in the sensing region of the temperature sensing module 120.

Alternatively, as illustrated in FIG. 9, the first cover 111" of the temperature sensor 100" according to the third embodiment of the present disclosure may be formed such that the third surface 111*c*" is formed inside the first protrusion 111*d* so that the area of the third surface 111*c*" coincides with the area sensed by the temperature sensing module 120.

As described above, measuring the temperature of the third surface 111*c*" transferred through the first cover 111" rather than directly measuring the temperature of the first surface 400*a* of the disc 400 through the temperature sensing module 120 protects the temperature sensing module 120 from the foreign substance generated by the friction between the disc 400 and the brake pads or the foreign substance drifting up from the road, thereby improving the measurement accuracy or durability of the temperature sensing module 120.

Further, failures caused by direct exposure of the temperature sensing module 20 to the disc 400 and consequently to the temperature beyond the temperature range measurable by the temperature sensing module 120 may be forestalled.

On the other hand, as illustrated in FIG. 4, the connector 140 supplying power to the temperature sensing module 120, transceiving signals for controlling the temperature sensing module 120, and transmitting the information measured by the temperature sensing module 120 to the outside is connected to the rear side of the holder 112.

At this time, there is no limit in the way the temperature sensing module 120 and the connector 140 are connected. For example, as illustrated in FIG. 4, the connector 140 may be connected to the holder 112 through a conductive cable 150. That is, one end of the conductive cable 150 may be coupled to the rear of the holder 112 and the other end of the conductive cable 150 may be coupled to the connector 140 so that the connector 140 and the temperature sensing module 120 may be electrically connected.

Further, although it is not illustrated in the drawings, the connector 140 and the temperature sensing module 120 may be connected through wireless communication. In this case, a communication module (not shown) is connected to the rear of the holder 112, and the connector 140 is disposed outside the housing 110'. The connector 140 may receive and transmit to the outside the temperature information measured by the temperature sensing module 120 via a wireless communication module (not shown).

A second cover 113 is described with reference to FIGS. 4 to 6 in the following. At this time, the description of the second cover 113 replaces the description of the second cover 113 of the first and third embodiments.

As illustrated in FIGS. 4 and 5, the second cover 113 is coupled to the rear of the holder 112. There is no limit in the way the second cover 113 is coupled to the holder 112, and various known ways may be employed. For example, as illustrated in FIG. 6, a screw thread may be formed on the outer circumferential surface of the rear end of the holder 112 and a screw thread is formed on the inner circumferential surface of the second cover 113 so that the holder 112 and the second cover 113 may be coupled by screwing.

As the second cover 113 and the holder 112 are coupled, a second inner space 113*a* is formed by the second cover 113 and the holder 112. The second inner space 113*a* is closed off such that one end of the conductive cable 150 connected to the temperature sensing module 120 fixed to the holder 112 is not exposed to the outside.

At this time, a first sealing member 160 may be disposed between the second cover 113 and the holder 112 to prevent an unforeseen short circuit that may occur by substances-liquid foreign substances, in particular-introduced into the second inner space 113*a* reaching the connecting portion between the conductive cable 150 and the temperature sensing module 120. Further, a cover through hole 113*b* is formed in the second cover 113 so that the conductive cable 150 may be connected to the connector 140 disposed outside the second cover 113. Accordingly, as illustrated in FIG. 6, the conductive cable 150 is disposed through the second cover 113.

At this time, a second sealing member 170 may be further disposed between the cover through hole 113*b* and the outer circumferential surface of the conductive cable 150 to prevent foreign substances from moving into the second inner space 113*a* through the cover through hole 113*b*.

On the other hand, a bracket 300 is formed in the pad housing 500 or the carrier 600 to fix the temperature sensor 100, 100', 100" described above in the rear of the disc 400. The bracket 300 may be integrally formed in the pad housing 500 or the carrier 600 or may be fixedly coupled to the pad housing 500 or the carrier 600.

There is no limit in the shape of the bracket as long as the bracket may fix the temperature sensor 100. The bracket 300 of the disc brake 1 having the temperature sensor 100 according to the first embodiment for fixing the temperature sensor 100 to the bracket will be described with reference to FIGS. 1 and 2 in the following.

The bracket 300 protrudes laterally from the carrier 600. A first through 310 penetrating in the direction perpendicular to the first surface 400*a* of the disc 400 is formed in the bracket 300. At this time, the housing 110 of the temperature sensor 100 is fixedly inserted into the first through hole 310. Accordingly, the second surface 111*b* of the housing 110 may be disposed parallel to the first surface 400*a*.

As illustrated in FIG. 2, a first screw thread 114 may be formed on the outer circumferential surface of the housing 110, and a second screw thread 320 may be formed on the inner circumferential surface of the first through hole 310. Accordingly, the housing 110 may be coupled to the bracket 300 by screwing.

As described above, the housing 110 is coupled to the bracket by screwing so that the third interval d3 which is the distance between the first surface 400*a* and the second surface 111*b* may be adjusted in the rotation direction of the housing 110.

The bracket 300 of the disc brake 1 having the temperature sensor 100" according to the third embodiment for fixing the temperature sensor 100 to the bracket 300 will be described with reference to FIGS. 7 to 9 in the following.

As illustrated in FIG. 9, a third through hole 310 is also formed in the bracket 300 and the housing 110" is inserted into the first through hole 310 according to the third embodiment. However, the housing 110" and the bracket 300 are not directly coupled by screwing in the third embodiment.

As illustrated in FIG. 8, a second protrusion 111*e* protruding from the side of the housing 110" is formed to couple the housing 110" to the bracket 300. A pair of second protrusions 111*e* may be formed. At this time, the pair of second protrusions 111*e* may protrude in opposite directions.

The housing 110" may be inserted from the rear toward the front from the rear of the bracket 300. In this case, the front surface of the second protrusion 111*e* is in contact with the rear surface of the bracket 300. At this time, the housing 110" may be fixed to the bracket 300 by fixing the second protrusion 111*e* and the bracket 300.

To this end, a second through hole 330 is formed in the bracket 300 and a third through hole 111*f* is formed at a position corresponding to the position of the second through hole 330 in the second protrusion 111*e* of the housing 110". At this time, a bolt 700 is inserted through the second through hole 330 and the third through hole 111*f* and a nut 800 is coupled to the bolt 700 so that the housing 110" is fixed to the bracket 300. This allows a firmer coupling of the housing 110" to the bracket 300 than the direct coupling of the housing 110" to the bracket 300 by screwing.

On the other hand, as illustrated in FIG. 7, a cover portion 340 may be formed in the bracket 300 of the disc brake 1 having the temperature sensor 100" according to the third embodiment of the present disclosure.

The cover portion 340 covers the front side of the first through hole 310 formed in the bracket 300. At this time, the cover portion 340 is formed convex toward the front so that the housing 110" may be disposed for insertion through the first through hole 310. Accordingly, as illustrated in FIG. 9, the tip end portion of the housing 110" is disposed inside the cover portion 340.

As illustrated in FIG. 9, a fourth through hole 341 is formed in the penetrating direction of the first through hole 310 in the cover portion 340. At this time, the first protrusion 111*d* of the first cover 111" of the housing 110" is inserted into the fourth through hole 341.

That is, the first protrusion 111*d* of the first cover 111" is exposed toward the disc 400 through the fourth through hole 341, and the portions other than the first protrusion 111*d* of the first cover 111" is covered by the cover portion 340 not to be exposed toward the disc 400.

Accordingly, the heat generated on the rear surface of the disc 400 concentrates only on the first protrusion 111*d* of the first cover 111". Accordingly, the heat collected through the second surface 111*b*" may concentrate on the third surface 111*c*", thereby improving the measurement accuracy of the temperature sensing module 120.

Further, the cover portion 340 covers the first cover 111" except the first protrusion 111*d* so that the heat generated in the disc 400 may be prevented from being transferred through the first cover 111 except the first protrusion 111*d*. This may prevent the temperature sensing module 120 disposed in the first inner space 111*a*" from being disposed in a high-temperature environment by excessive overheating of the first cover 111".

That is, heat transfer concentrates on the third surface 111*c*" which is the area the temperature sensing module 120 measures the temperature while heat transfer to the temperature sensing module 120 is prevented, thereby improving the durability of the temperature sensing module 120.

According to an embodiment of the present disclosure, the temperature sensing module is disposed inside the housing so that the temperature sensor and the disc brake having the temperature sensor may measure the temperature of the measurement target in real time free from the effect of the environment.

It is to be understood that the effects of the present disclosure are not limited to the effects described above and include all the effects deducible from the configuration of the disclosures described in the descriptions or claims of the present disclosure.

Preferred embodiments of the present disclosure are described above, and it is obvious to those skilled in the art that the present disclosure may be embodied in specific forms other than the embodiment described above without departing from the intention and scope of the present disclosure. Therefore the above-described embodiments are to be considered illustrative rather than restrictive, and thus the present disclosure may be modified within the scope of the appended claims and their equivalents rather than being limited to the above descriptions.

DESCRIPTION OF REFERENCE NUMERAL

1: disc brake
100, 100'. 100": temperature sensor
110, 110', 110": housing
111, 111', 111": first cover
111*a*, 111*a*", 111*a*": first inner space
111*b*, 111*b*', 111*b*": second surface
111*c*, 111*c*', 111*c*": second surface
111*d*: first protrusion
111*e*: second protrusion
111*f*: third through hole
111g: third protrusion
113*a*: second inner space
113*b*: cover through hole
112: holder
113: second cover
114: first screw thread
115: partitioning wall
120: temperature sensing module
140: connector
150: conductive cable
160: first sealing member
170: second sealing member
300: bracket
310: first through hole
320: second screw thread
330: second through hole
340: cover portion
341: fourth through hole
400: disc
400*a*: first surface
500: pad housing
600: carrier
700: bolt
800: nut

What is claimed is:

1. A temperature sensor for measuring temperature of a first surface of a measurement target, the temperature sensor comprising:

a housing having a second surface outside spaced apart from the first surface at a predetermined interval to receive heat from the first surface and a third surface formed on one side of a first inner space formed inside to receive heat from the second surface;

a temperature sensing module fixed to the housing to sense the temperature of the third surface; and a connector transmitting temperature information sensed by temperature sensing module to the outside wherein the housing extends in a sensing direction of the temperature sensing module, and the second surface is formed on an outer surface of an extending tip end portion of the housing, and wherein the housing is formed such that an area of a cross section perpendicular to the sensing direction decreases toward the extending tip end portion.

2. The temperature sensor of claim 1, wherein the temperature sensing module is fixed to the other side of the first inner space, and the first inner space is closed off to the outside.

3. The temperature sensor of claim 2, wherein the temperature sensing module is positioned to face the second surface.

4. The temperature sensor of claim 1, wherein the temperature sensing module measures the temperature of the third surface by sensing infrared rays emitted from the third surface.

5. The temperature sensor of claim 1, wherein the third surface is positioned to face the second surface.

6. The temperature sensor of claim 5, wherein the third surface is formed such that a center of the third surface coincides with a center of a sensing region of the temperature sensing module.

7. The temperature sensor of claim 1, wherein the housing includes a holder of which the temperature sensing module is fixed to one side and the connector is connected on the other side and a first cover coupled to one side of the holder to form the closed first inner space, the second surface is formed on one side of the outside of the first cover, and the third surface is formed on one side of the inside of the first cover.

8. The temperature sensor of claim 7, wherein the housing includes a second cover coupled to the other side of the holder to form a closed second inner space and the connector is connected to the temperature sensing module through a conductive cable.

9. The temperature sensor of claim 8, wherein the second cover includes a cover through hole formed on one side, one end of the conductive cable is disposed in the second inner space through the cover through hole, and a second sealing member disposed between the cover through hole and an outer circumferential surface of the conductive cable is further included.

10. The temperature sensor of claim 1, wherein the third surface is included in a sensing region of the temperature sensing module.

11. The temperature sensor of claim 1, wherein the third surface is spaced apart from the temperature sensing module at a predetermined interval.

12. A temperature sensor for measuring temperature of a first surface of a measurement target, the temperature sensor comprising:

a housing having a second surface outside spaced apart from the first surface at a predetermined interval to receive heat from the first surface and a third surface formed on one side of a first inner space formed inside to receive heat from the second surface;

a temperature sensing module fixed to the housing to sense the temperature of the third surface; and a connector transmitting temperature information sensed by temperature sensing module to the outside, wherein the housing includes a first protrusion protruding toward the first surface of the measurement target, the second surface is formed outside a tip end portion of the first protrusion, and the third surface is formed inside the tip end portion of the first protrusion.

13. A disc brake having a temperature sensor, the disc brake comprising:

a plate-shape disc;

a first brake pad and a second brake pad configured to press one side of one surface and one side of the other surface of the disc respectively;

a temperature sensor including a housing of which a second surface is formed on one side of the outside and a third surface is formed on one side of the inside, a temperature sensing module fixed to the housing to sense the temperature of the third surface, and a connector transmitting temperature information sensed by the temperature sensing module to the outside; and a bracket fixing the housing such that the second surface of the housing is positioned to be spaced apart at a third interval from a first surface position on the other side of the other surface of the disc, wherein the bracket further includes a first through hole penetrating in a direction perpendicular to the first surface and a second through hole penetrating in the penetrating direction of the first through hole, the housing further includes a third protrusion protruding from a side and a third through hole penetrating the third protrusion in a sensing direction of the temperature sensing module, and the housing is inserted into the first through hole to be coupled by screwing through the second through hole and the third through hole.

14. The disc brake of claim 13, wherein the bracket fixes the housing such that the second surface is parallel to the first surface.

15. The disc brake of claim 13, wherein the bracket includes a first through hole, and the housing is inserted into the first through hole to be coupled by screwing.

16. The disc brake of claim 15, wherein the first through hole penetrates the bracket in a direction perpendicular to the first surface, and the housing moves back and forth in a direction perpendicular to the first surface in a rotation direction.

17. The disc brake of claim 13, wherein the housing includes a first protrusion protruding toward the first surface of the disc, the second surface is formed outside a tip end portion of the first protrusion, the third surface is formed inside the tip end portion of the first protrusion, the bracket further includes a first through hole in a direction perpendicular to the first surface, a second through hole penetrating in a penetrating direction of the first through hole, a cover portion covering the first surface side of the first through hole, and a fourth through hole formed in the cover portion, the housing is inserted into the first through hole, and the first protrusion of the housing is inserted into the fourth through hole.

* * * * *